US011148071B2

(12) United States Patent
Kelsey

(10) Patent No.: US 11,148,071 B2
(45) Date of Patent: Oct. 19, 2021

(54) SEPARATION SYSTEM AND METHOD

(71) Applicant: Pentair Filtration Solutions, LLC, Hanover Park, IL (US)

(72) Inventor: John Byron Kelsey, Porter, TX (US)

(73) Assignee: Pentair Filtration Solutions, LLC, Hanover Park, IL (US)

( * ) Notice: Subject to any disclaimer, the term of this patent is extended or adjusted under 35 U.S.C. 154(b) by 0 days.

(21) Appl. No.: 15/305,856

(22) PCT Filed: Apr. 21, 2015

(86) PCT No.: PCT/US2015/026944
§ 371 (c)(1),
(2) Date: Oct. 21, 2016

(87) PCT Pub. No.: WO2015/164424
PCT Pub. Date: Oct. 29, 2015

(65) Prior Publication Data
US 2017/0043278 A1 Feb. 16, 2017

Related U.S. Application Data

(60) Provisional application No. 61/982,192, filed on Apr. 21, 2014.

(51) Int. Cl.
*B01D 17/04* (2006.01)
*C10G 31/09* (2006.01)
(Continued)

(52) U.S. Cl.
CPC ........... *B01D 17/045* (2013.01); *B01D 17/10* (2013.01); *B01D 19/0031* (2013.01);
(Continued)

(58) Field of Classification Search
None
See application file for complete search history.

(56) References Cited

U.S. PATENT DOCUMENTS

| 312,527 A | * | 2/1885 | Spitznagel | B01D 35/12 210/341 |
| 2,710,071 A | * | 6/1955 | Kinser | C10G 33/06 114/74 R |

(Continued)

OTHER PUBLICATIONS

International Search Report for PCT/US2015/026944; dated Jul. 15, 2015; 3 pages.

*Primary Examiner* — Robert J Popovics
(74) *Attorney, Agent, or Firm* — Husch Blackwell LLP

(57) ABSTRACT

Embodiments of the invention include a filtration system with a separation system including a primary process vessel with a main body enclosing an internal volume, and a removable end cap coupled to one of the ends of the main body. The primary process vessel includes fluid apertures enabling a fluid stream to enter or exit the inner volume. The separation system includes a filter support positioned in the inner volume, and a filter assembly coupled to the filter support. In some embodiments, the filtration system further includes a support frame, and the separation system is mounted on the support frame. In some embodiments, the separation system is fluidly coupled to another separation system. In some embodiments, the filter assembly includes a coalescing filter. In some further embodiments, the filter assembly includes a filter configured and arranged to filter hydrocarbons.

16 Claims, 11 Drawing Sheets

(51) Int. Cl.
*C10G 33/06* (2006.01)
*B01D 19/00* (2006.01)
*B01D 17/00* (2006.01)
*C10L 3/10* (2006.01)

(52) U.S. Cl.
CPC ............ *C10G 31/09* (2013.01); *C10G 33/06* (2013.01); *C10L 3/10* (2013.01); *C10L 2290/547* (2013.01); *C10L 2290/562* (2013.01); *C10L 2290/565* (2013.01); *C10L 2290/567* (2013.01)

(56) References Cited

U.S. PATENT DOCUMENTS

| | | | | |
|---|---|---|---|---|
| 3,027,009 A * | 3/1962 | Price | ............... | B01D 17/045 210/236 |
| 3,228,174 A * | 1/1966 | Perry | ............... | B01D 19/0052 55/484 |
| 3,646,730 A * | 3/1972 | Reid | ............... | B01D 46/0021 55/302 |
| 3,888,644 A * | 6/1975 | Holland | ............... | B01D 46/00 55/318 |
| 4,180,391 A * | 12/1979 | Perry, Jr. | ............... | B01D 45/16 55/324 |
| 4,297,116 A * | 10/1981 | Cusick | ............... | B01D 46/002 55/319 |
| 4,411,779 A * | 10/1983 | McConnell, III | ...... | B01D 24/10 210/108 |
| 4,497,707 A * | 2/1985 | Anderson | .......... | B01D 17/0202 210/136 |
| 4,664,798 A | 5/1987 | Bergh | | |
| 5,358,552 A * | 10/1994 | Seibert | ............... | B01D 46/002 55/291 |
| 5,437,788 A * | 8/1995 | Geibel | ............... | B01D 29/114 210/333.01 |
| 5,480,547 A * | 1/1996 | Williamson | ......... | B01D 17/045 210/533 |
| 5,865,992 A * | 2/1999 | Edmondson | ........... | B01D 17/00 210/180 |
| 5,919,284 A * | 7/1999 | Perry, Jr. | ............... | B01D 45/02 55/319 |
| 6,168,647 B1 | 1/2001 | Perry, Jr. et al. | | |
| 6,187,079 B1 * | 2/2001 | Bridger | ............... | B01D 17/00 95/253 |
| 6,413,435 B1 | 7/2002 | Kyles et al. | | |
| 7,014,685 B2 * | 3/2006 | Burns | ............... | B01D 29/114 55/356 |
| 7,108,738 B2 * | 9/2006 | Burns | ............... | B01D 29/114 55/356 |
| 7,297,279 B2 * | 11/2007 | Johnson | ............... | B01D 17/045 210/669 |
| 7,416,667 B2 * | 8/2008 | Benachenou | ...... | B01D 17/0208 210/285 |
| 7,635,435 B2 * | 12/2009 | Benachenhou | .... | B01D 17/0202 210/108 |
| 8,297,448 B2 * | 10/2012 | Watson | ..................... | E02B 5/08 210/170.09 |
| 8,689,432 B2 * | 4/2014 | Wind | ................. | B01D 53/1425 29/700 |
| 8,764,975 B2 * | 7/2014 | Salmisuo | ................ | A61L 11/00 210/104 |
| 8,936,661 B2 * | 1/2015 | Burns | ................ | B01D 46/0024 55/482 |
| 8,951,333 B2 * | 2/2015 | Cabourdin | ............ | B01D 45/12 55/318 |
| 8,986,431 B2 * | 3/2015 | Cabourdin | ......... | B01D 46/2407 55/309 |
| 9,061,231 B2 * | 6/2015 | Cabourdin | ......... | B01D 46/0058 |
| 9,108,872 B2 * | 8/2015 | Salmisuo | ................ | A61L 11/00 |
| 9,707,498 B2 * | 7/2017 | Hampton | ............... | B01D 29/50 |
| 9,815,012 B2 * | 11/2017 | Cloud | ................ | B01D 46/0031 |
| 2004/0026312 A1 * | 2/2004 | Tully | ..................... | B01D 29/27 210/452 |
| 2006/0231510 A1 * | 10/2006 | Benachenhou | .... | B01D 17/0202 210/799 |
| 2007/0251876 A1 * | 11/2007 | Krogue | ............... | B01D 39/163 210/323.2 |
| 2008/0237152 A1 * | 10/2008 | Benachenhou | ........ | B01D 17/10 210/799 |
| 2009/0039021 A1 * | 2/2009 | Benachenou | ...... | B01D 17/0208 210/643 |
| 2010/0224065 A1 * | 9/2010 | Clarke | ............... | B01D 46/0024 95/282 |
| 2011/0174693 A1 | 7/2011 | Rabe et al. | | |
| 2012/0210688 A1 * | 8/2012 | Burns | ................ | B01D 46/0024 55/483 |
| 2012/0255228 A1 * | 10/2012 | Wind | ................. | B01D 53/1425 48/127.9 |
| 2012/0267323 A1 * | 10/2012 | Salmisuo | ................ | A61L 11/00 210/766 |
| 2012/0301356 A1 * | 11/2012 | Olson | ....................... | A61L 2/20 422/33 |
| 2013/0062273 A1 * | 3/2013 | Burns | .................... | B01D 29/52 210/345 |
| 2014/0251923 A1 * | 9/2014 | Salmisuo | ................... | A61L 11/00 210/742 |
| 2015/0299583 A1 * | 10/2015 | Kelsey | .................... | B01D 17/10 210/799 |
| 2017/0043278 A1 * | 2/2017 | Kelsey | .................. | B01D 17/10 |

* cited by examiner

SEPARATION SYSTEM AND METHOD

CROSS REFERENCE TO RELATED APPLICATIONS

This application claims the benefit of filing date of U.S. Provisional Application Ser. No. 61/982,192 titled "SEPARATION SYSTEM AND METHOD filed on Apr. 21, 2014, the specification of which is incorporated by reference herein in its entirety.

BACKGROUND

Petroleum producers, refiners and gas processors (including onshore and offshore), and chemical manufacturers utilize separation systems to filter, process, and recover hydrocarbons and other chemical products from a variety of raw material process streams. Separation systems of this nature need to account for an inlet stream that can comprise a complex heterogeneous mixture of solids, liquids, and gaseous materials that requires processing to achieve separation of one or more components with a predetermined efficiency.

Conventional separation technologies are usually assembled and configured as multiple separation vessels interconnected with piping, valve assemblies, and associated control and monitoring systems. These technologies are often bulky, requiring a large footprint, and are usually only configured to perform one type of separation process, or minor variations of the process. These systems are typically not configured for significantly different processes or input streams unless they are substantially modified, or coupled to a secondary separation and process system. Hence there is a need for separation systems with improved compactness and modularity, while providing flexible configurations enabling a plurality of process options within a single unit.

SUMMARY OF THE INVENTION

Some embodiments of the invention include a filtration system comprising at least one separation system comprising a primary process vessel comprising a main body including first and second ends. The main body encloses an internal volume, and at least one removable end cap is coupled to at least one of the ends of the main body. The primary process vessel comprises a plurality of fluid apertures configured and arranged to enable at least one fluid stream to enter or exit the inner volume of the primary process vessel. The plurality of fluid apertures includes at least one fluid inlet port and at least one fluid outlet port. Further, the at least one separation system comprises at least one filter support positioned in the inner volume, and at least one filter assembly coupled to the at least one filter support.

In some embodiments, the plurality of fluid apertures comprises at least one vent and at least one drain. In some embodiments, the at least one separation system further comprises at least one control valve coupled to at least one aperture. In some embodiments, the at least one control valve is coupled to the at least one aperture using a T-junction.

In some further embodiments of the invention, the filtration system further comprises a support frame, the at least one separation system mounted on the support frame. In some embodiments, the support frame comprises at least one support coupled to and at least partially supporting the primary process vessel. In some embodiments, the separation system is fluidly coupled to at least one other separation system using the at least one aperture.

In some embodiments, the at least one filter assembly includes at least one coalescing filter. In some further embodiments, the at least one filter assembly includes at least one filter configured and arranged to filter hydrocarbons.

Some embodiments of the invention include a filtration method comprising providing at least one separation system comprising a primary process vessel comprising a main body including first and second ends. The main body encloses an internal volume, and at least one removable end cap is coupled to at least one of the ends of the main body. The primary process vessel includes a plurality of fluid apertures configured and arranged to enable at least one fluid stream to enter or exit the inner volume of the primary process vessel. The plurality of fluid apertures include at least one fluid inlet port and at least one fluid outlet port, and at least one filter support is positioned in the inner volume, and at least one filter assembly is coupled to the at least one filter support. The filtration method includes operating the at least one separation system using at least one process configuration comprising passing at least one untreated fluid stream into the at least one fluid inlet port, filtering the at least one untreated fluid stream using the at least one filter assembly to form at least one treated fluid stream, and eluting the at least one treated fluid stream from the primary process vessel using the at least one fluid outlet port.

In some embodiments of the filtration method, the plurality of fluid apertures comprise at least one vent, at least one drain, and at least one control valve coupled to at least one aperture. In some embodiments of the filtration method, the process configuration comprises passing four fluid inlet streams into the primary process vessel using four inlet ports and two fluid outlet streams out of the primary process vessel exiting through two outlet ports.

In some embodiments of the filtration method, the process configuration comprises passing two fluid inlet streams into the primary process vessel using two inlet ports and eluting four fluid outlet streams from the primary process vessel exiting through four fluid outlet ports. In some embodiments, the four outlet streams comprise two continuous phase outlet streams and two discontinuous phase outlet streams.

In some embodiments of the filtration method, the process configuration comprises passing two fluid inlet streams into the primary process vessel using two inlet ports and eluting three fluid outlet streams from the primary process vessel exiting through three outlet ports. In some embodiments, the three outlet streams comprise two discontinuous phase outlet streams and one continuous phase outlet stream.

In some embodiments of the filtration method, the process configuration comprises passing two fluid inlet streams into the primary process vessel using two inlet ports, eluting two fluid outlet streams from the primary process vessel using two outlet ports, and a re-injection process, the re-injection process comprising passing a wash fluid from one fluid outlet port and into a fluid inlet port. In some embodiments, the wash fluid comprises amine water. In some further embodiments, the process configuration is a substantially continuous process.

In some embodiments of the filtration method, the at least one process configuration comprises sharing or exchanging fluid streams between at least two separation systems using the at least one aperture.

DETAILED DESCRIPTION

Figure 1:
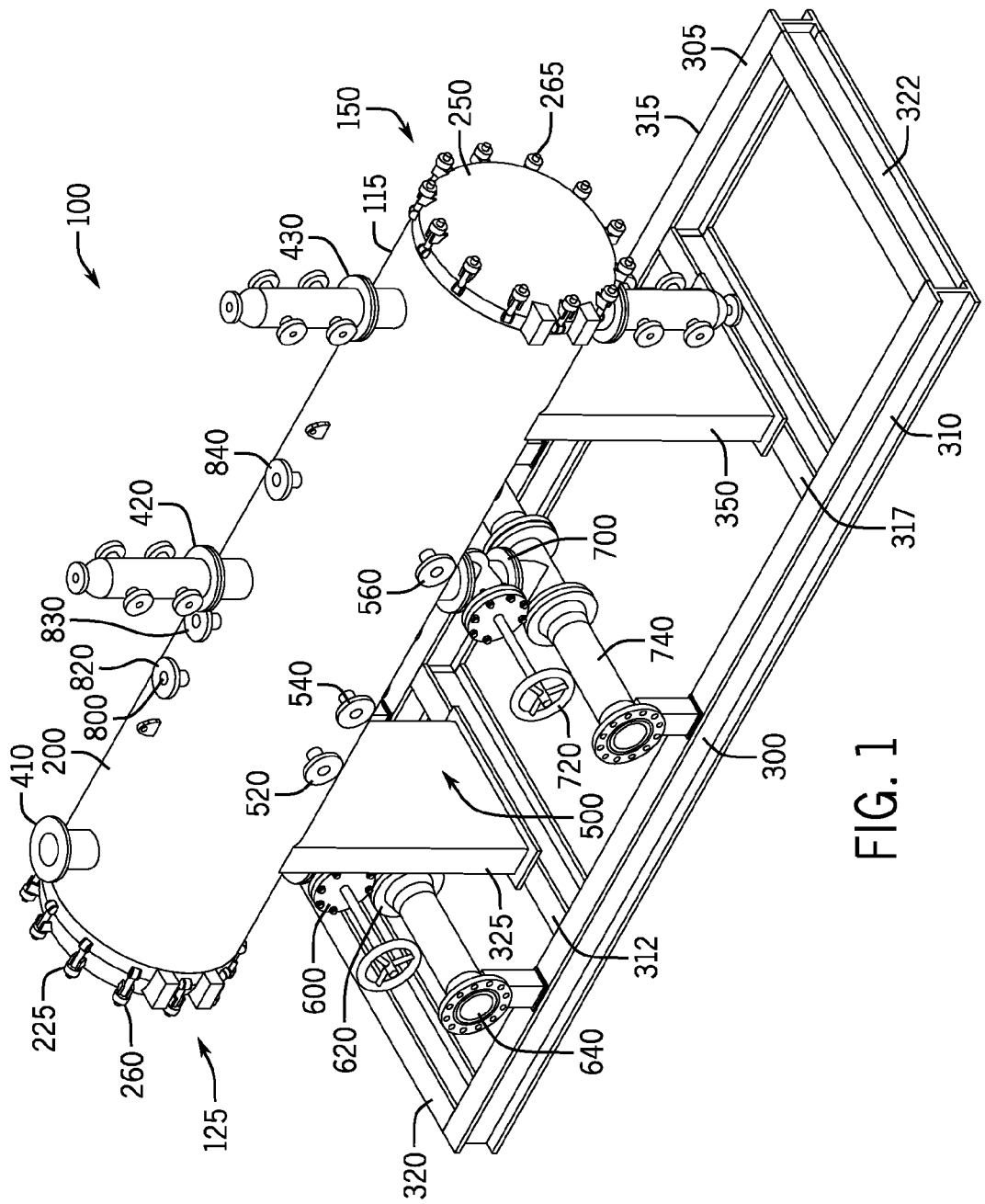
FIG. 1 illustrates a perspective view of a separation system in accordance with embodiments of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Moreover, the figures disclosed and described herein represent high-level visualizations. Those of ordinary skill in the art will appreciate that each figure is presented for explanation only and does not include each and every decision, function, and feature that may be implemented. Likewise, the figures and related discussions are not intended to imply that each and every illustrated decision, function, and feature is required or even optimal to achieve the disclosed desired results.

Some embodiments of the invention as illustrated in FIGS. 1-11 provide a compact, flexible, and modular separation and filtration technology that can be used to process a wide variety of material streams including solids, fluids, including liquids, and gases, and mixtures thereof. Some embodiments of the invention can separate, filter, process, and recover hydrocarbons and other chemical products or materials from a wide variety of raw material process streams. Moreover, the embodiments as described and illustrated herein offer process flexibility to enable customization to one or more processes depending on the input stream and output stream specification and efficiency.

FIG. 1 illustrates a perspective view of a separation system 100 according to some embodiments of the invention. In some embodiments as shown, the separation system 100 can comprise a primary process vessel 115 including a main body 200 including a first end 125 and a second end 150. In some embodiments, at least one of the ends 125, 150 can be at least partially opened to enable access to an internal portion of the main body 200 (shown in FIG. 1 as internal volume 210 in FIG. 2). In some embodiments of the invention, the first end 125 can include a first removeable end cap 225. In some embodiments, the first removeable end cap 225 can be coupled to the main body 200 using a plurality of removeable bolts 260. However any conventional coupling mechanisms or devices can be used to couple and uncouple the first removeable end cap 225. To enable access to the internal volume 210, the plurality of bolts 260 can be removed from the first end 125 of the main body 200, and the first removeable end cap 225 can be decoupled, opened, and/or removed from the main body 200. Further, the main body 200 can be at least partially sealed at the first end 125 by coupling the first removeable end cap 225 to the first end 125. In some further embodiments of the invention, the second end 150 can include a second removeable end cap 250. In some embodiments, the second removeable end cap 250 can be coupled to the main body 200 using a plurality of removeable bolts 260. By removing the plurality of bolts 260, the second removeable end cap 250 can be removed from the second end 150 of the main body 200 to enable access to the internal volume 210. Further, the main body 200 can be sealed at the second end 150 by coupling the second removeable end cap 250 to the second end 150. In some embodiments, the first removeable end cap 225 and the second removeable end cap 250 can be substantially the same. In some embodiments, the first removable end cap 225 and the second removable end cap 250 can be exchanged. For example, in some embodiments, the first removeable end cap 225 can be coupled to the main body 200 at the second end 150, and the second removeable end cap 250 can be coupled to the main body 200 at the first end 125.

In some embodiments of the invention, the primary process vessel 115 can be suspended and/or supported on a frame or other mounting structure. For example, as shown in at least FIG. 1, in some embodiments, the primary process vessel 115 can be coupled to a support frame 300 using at least one support. For example, in some embodiments, using at least a first support 325 and/or a second support 350, the primary process vessel 115 can be supported and suspended by the frame 300. In some embodiments, the frame 300 can comprise a ladder-type structure comprising frame sides coupled to end supports. For example, in some embodiments, the frame 300 can comprise a first frame side 310 and a second frame side 315 coupled together at their ends by a plurality of cross-bars. For example, in some embodiments, the frame 300 can comprise a first end support 320 and a second end support 322. As shown at least in FIGS. 1, 3, and 10, in some embodiments, the frame 300 can comprise a first frame side 310 and a second frame side 315 coupled together at their ends by the first end support 320, and a second end support 322 forming a generally rectangular frame base 305. In this example embodiment, the first frame side 310 and the second frame side 315 are generally parallel, and the first end support 320 and a second end support 322 are generally parallel.

In some embodiments, the primary process vessel 115 can be coupled to the frame 300 using a plurality of vertical supports. For example, in some embodiments, two or more vertical supports can be used to mount the primary process vessel 115 to the frame, with each vertical support extending from a cross-bar generally adjacent to each end of the frame. For example, in some embodiments, the frame 300 can comprise at least a first cross support 312 and a second cross support 317 coupled to and extending between the first frame side 310 and the second frame side 315. In some embodiments, the cross-supports 312, 317 can be positioned generally equally spaced from each end of the frame base 305. In some other embodiments, the cross-supports 312, 317 can be positioned adjacent each end of the frame base 305, where the distance between the first frame support 312 at one end of the frame base 305 is different from the distance between the second frame support 317 at the opposite end of the frame base 305.

Figure 3:
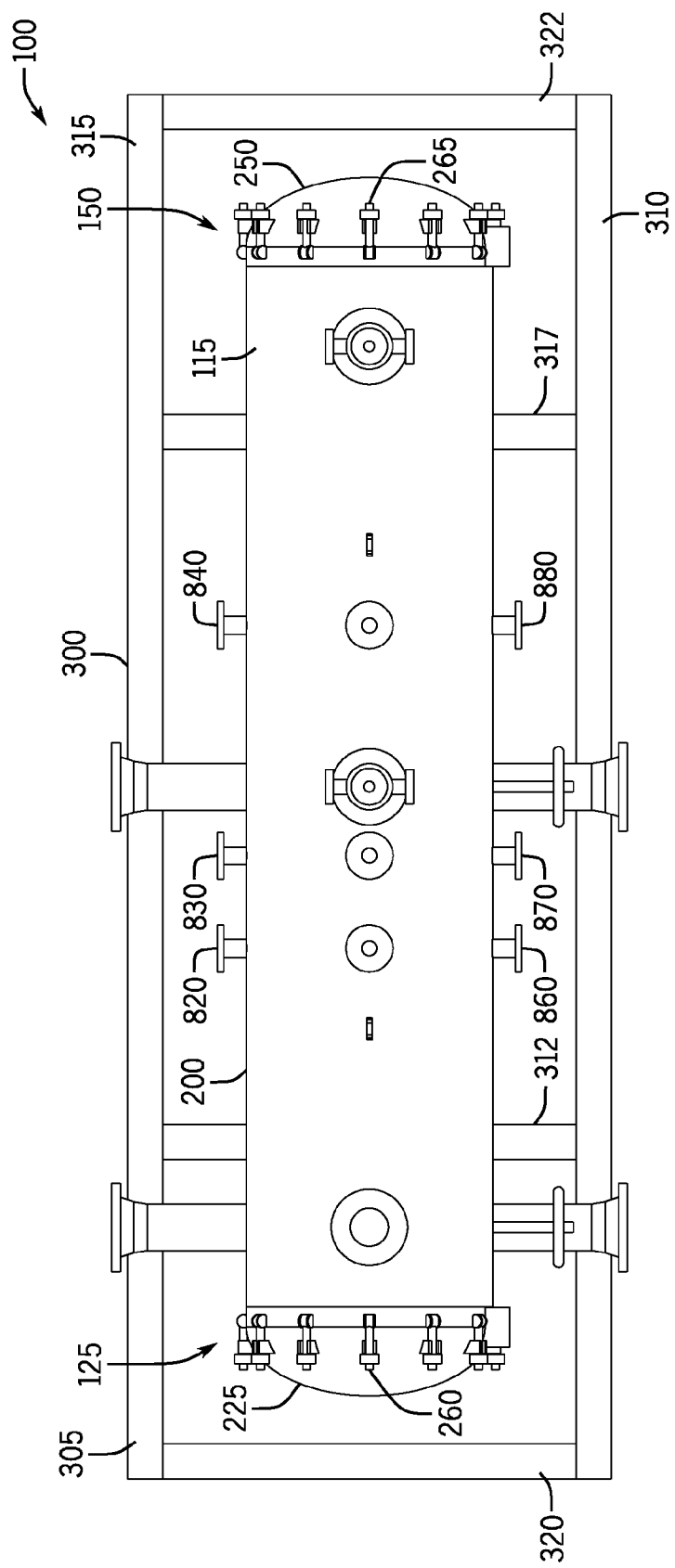
FIG. 3 illustrates a top view of a separation system in accordance with embodiments of the invention.
Figure 5:
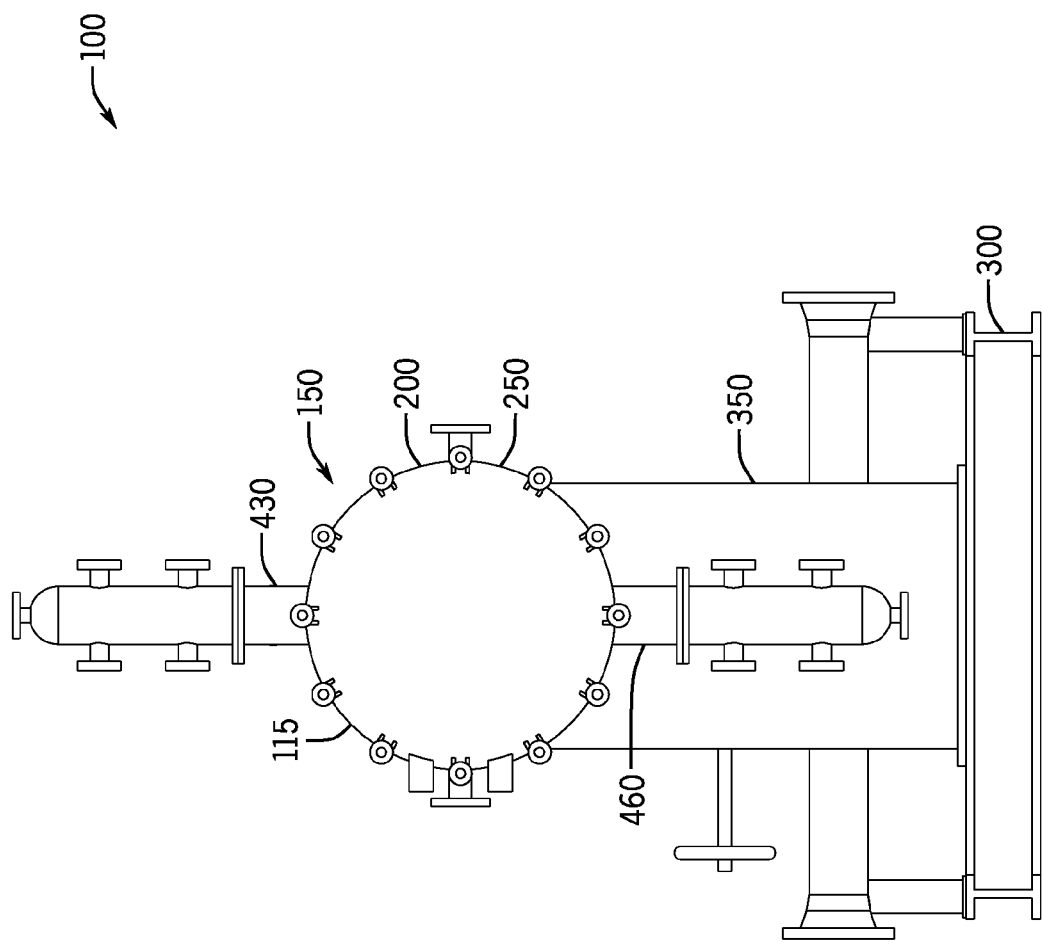
FIG. 5 illustrates an end view of a separation system in accordance with embodiments of the invention.

FIG. 3 illustrates a top view of a separation system 100 according to one embodiment of the invention, and FIG. 5 illustrates an end view of a separation system 100 according to one embodiment of the invention. In some embodiments, the primary process vessel 115 can be mounted substantially centrally within the frame 300. For example, in some embodiments, the distance of the first end 125 of the primary process vessel 115 to the first end support 320 of the support frame 300 can be generally the same as the distance of the second end 150 of the primary process vessel 115 is to the second end support 322. Further, in some embodiments, the primary process vessel 115 can be positioned within the support frame 300 so that the vessel is generally the same distance from the first frame side 310 and the second frame side 315. In some other embodiments, the primary process vessel 115 can be mounted substantially off-center within the frame 300. For example, in some embodiments, the first end 125 of the primary process vessel 115 can be positioned closer to the first end support 320 of the support frame 300 than the second end 150 of the primary process vessel 115 is to the second end support 322. In some further embodiments, the primary process vessel 115 can be positioned closer to the first frame side 310 that the second frame side 315.

In some other embodiments of the invention, either end 125, 150 of the primary process vessel can extend beyond an end of the support frame 300. For example, in some embodiments, the first end 125 of the primary process vessel can extend beyond the first end support 320 of the support frame 300. In some other embodiments, the second end 150 of the primary process vessel 115 can extend beyond the second end support 322 of the support frame 300. In some other embodiments, the primary process vessel 115 can be larger than that depicted in FIGS. 1-11 and/or the support frame 300 can be smaller than illustrated so that each end 125, 150 of the primary process vessel 115 can extend beyond the respective end of the support frame 115.

Figure 2:
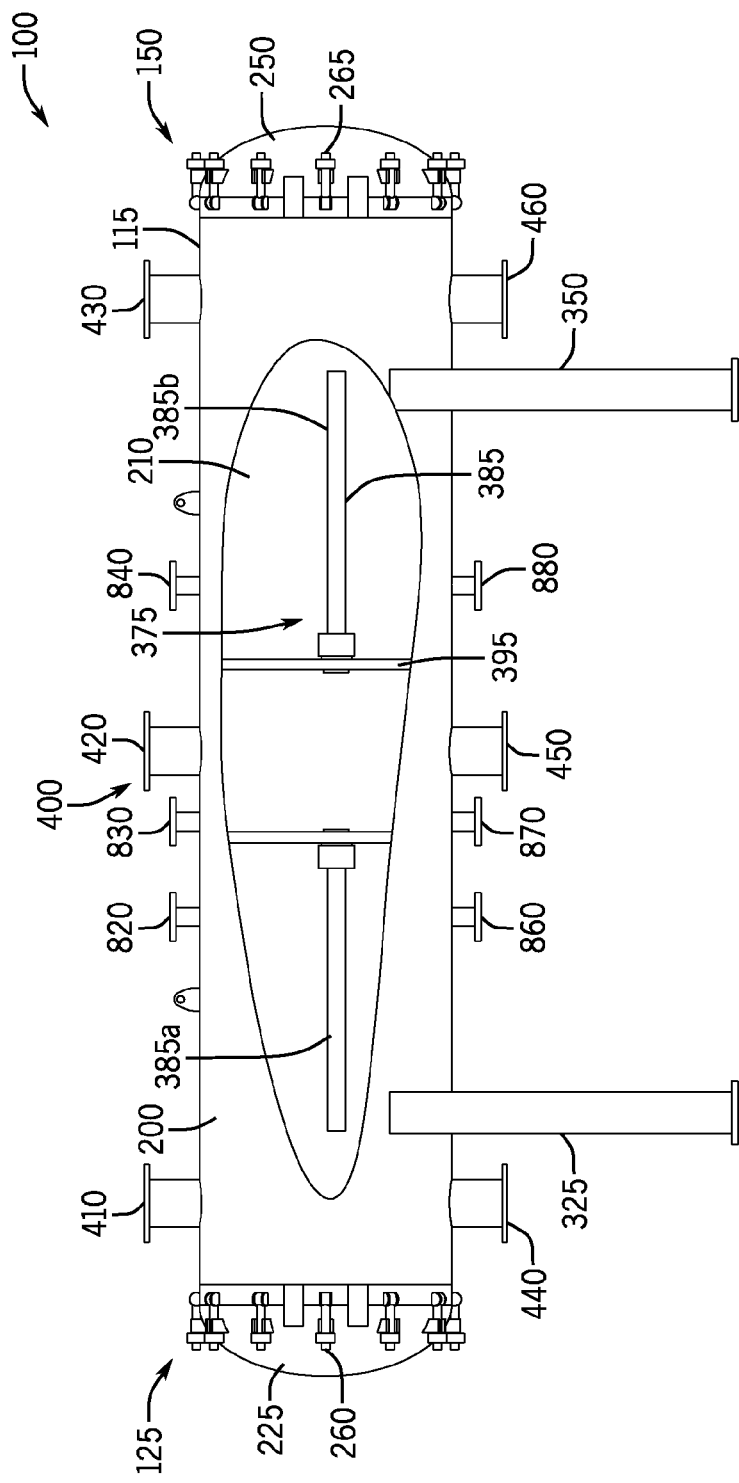
FIG. 2 illustrates a side cutaway view of a separation system in accordance with embodiments of the invention.

Some embodiments of the invention can include one or more filters or other process assemblies positioned within at least a portion of the primary process vessel. These filters and/or assemblies can be used to process and/or filter solids, liquids, and gases, and mixtures thereof. For example, FIG. 2 illustrates a side cutaway view of the separation system 100 shown in FIG. 1 including at least one filter assembly 375. In some embodiments, the separation system 100 can comprise at least one filter assembly 375 positioned within the primary process vessel 115. In this example, the primary process vessel 115 includes at least one filter assembly 375 positioned inside the primary process vessel 115. Some embodiments include two filter assemblies 375 positioned inside the primary process vessel 115, and in some further embodiments, the primary process vessel 115 can include three or more filter assemblies 375. In some embodiments, the filter assembly 375 can include at least one filter 385 mounted or couple to at least one filter support 395. In some embodiments, each filter assembly 375 can comprise more or fewer filters 385. Further, in some embodiments, each filter 385 is mounted to its own filter support 395. In other embodiments, multiple filters 385 can be mounted to a single support 395. The example shown in FIG. 2 includes two filter assemblies 375, however more or less filter assemblies 375 can be positioned within the primary process vessel 115 depending on the capacity of the primary process vessel 115, the size of the filter assemblies 375, and/or the process requirements or specifications of the separation system 100.

Figure 4:
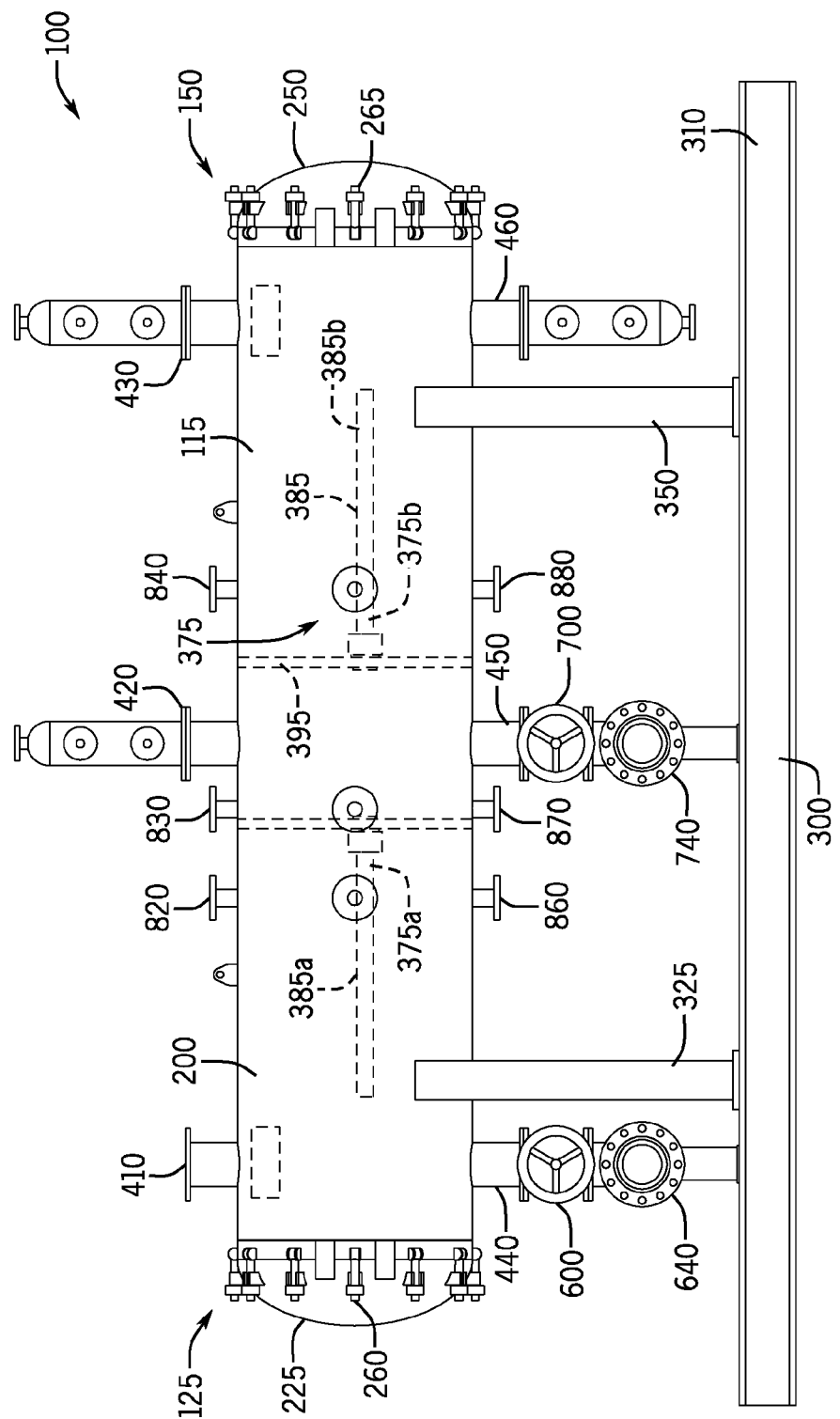
FIG. 4 illustrates a side view of a separation system in accordance with embodiments of the invention.

In some embodiments of the invention, the at least one filter assembly 375 can be positioned substantially centrally within the primary process vessel 115, and can extend from a location positioned generally adjacent to an axially center of the primary process vessel 115 towards an end 125, 150 of the primary process vessel 115. In the example shown in FIG. 2 including two filter assemblies 375, a first filter 385 can extend from a location positioned generally adjacent to an axial center of the primary process vessel 115 towards a first end 125 of the primary process vessel 115, and a second filter 385*b* can extend from a location positioned generally adjacent to an axially center of the primary process vessel 115 towards a second end 150 of the primary process vessel 115. As illustrated in FIG. 4, the first and second filter assemblies 375*a*, 375*b* can be separated by a distance of about twenty four inches. In some other embodiments, the filter assemblies 375*a*, 375*b* can be separated by a lesser or a greater distance than about twenty four inches. For example, in some embodiments, the filter assemblies 375*a*, 375*b* can be proximate each other. In other embodiments, the filter assemblies 375*a*, 375*b* adjacently positioned or coupled.

In some embodiments, the at least one filter assembly 375 of the separation system 100 can include one or more flexible and/or modular filters and/or other process assemblies positioned in at least a portion of the primary process vessel 115. For example, some embodiments of the invention can comprise dual fluid stream particle separation that can operate with twice the capacity of a conventional filter separator. Some further embodiments can include a liquid/liquid coalescing separation providing twice the capacity of a conventional filter separator. Some embodiments can include a compact Hydrocarbon Recovery Technology System (hereinafter referred to as HRT®) manufactured by Pentair, Inc. HRT® is a registered trademark of Pentair, Inc., or one of its global affiliates. In this embodiment, the separation system 100 can include HRT® technology, and can be used for water management in onshore and offshore applications such as salt water disposal oil applications. In this example, the separation system 100 including HRT® can remove solids as fine as ½ micron to 99.98% efficiency with hydrocarbon concentrations greater than 5%, and with hydrocarbon specific gravities as high as 0.98. This can allow effective separation of hydrocarbons as heavy as polynuclear aromatic oils, and can intercept and recover stable emulsified hydrocarbons, blocking substantially all hydrocarbons from passing through the separation process.

In some further embodiments of the invention, the at least one filter assembly 375 of the separation system 100 can include a compact Pentair polar extraction system. For example, in some embodiments, the primary vessel can include Pentair Porous Media's POLAREX® technology. In this instance, the separation system 100 can provide chemical manufacturers, refiners and gas processors improved separation of entrained and dissolved contaminants relative to that achievable through implementation of conventional water wash or solvent scrubbing towers. Conventional approaches to washing or scrubbing are often limited by contact efficiency and subsequent separation efficiency, resulting in limited performance and large capital investments. The POLAREX® platform can include a single stage, high efficiency, structured contactor/separator within the separation system 100, and can be applied to the extraction of soluble components from either liquid or gas process streams. Further, the separation system 100 equipped in this way can be applied to both contaminant removal (e.g.— caustic, dissolved acids, salts, acid gases or reaction byproducts) as well as recovery of valuable products or solvents (e.g.—recover soluble amines from treated LPG) for as little as 20% of the capital associated with a conventional wash system. Further, when applied to batch chemical processes, the technology can increase process speed and operational flexibility. Traditional approaches to neutralization or product washing require a lengthy neutralization or wash step followed by decanting and transfer. Not only do these steps slow reactor turn over, they also frequently result in carry-over of salts and impurities due to the limited separation effectiveness of decanting, particularly with emulsified product/water mixtures. By implementing the POLAREX® technology within the separation system 100, neutralization or washing can proceed on-line during product transfer, allowing the wash/decant steps to be eliminated entirely.

In some other embodiments of the invention, the at least one filter assembly 375 of the separation system 100 can include a process technology comprising a LIQUISEP® technology from Pentair, Inc. This technology was developed to address the inherent deficiencies of conventional coalescers, making it possible to remove essentially all immiscible water dispersions from hydrocarbon process streams. The LIQUISEP® technology overcomes the limitations of conventional separators, vane pack coalescers, wire mesh coalescers and even "high efficiency" mesh pads and filter separators, achieving superior separations under demanding conditions. LIQUISEP technology makes use of proprietary LIQUIFORM™ media and an APEX® element design to intercept entrained droplets of even submicron geometries and effectively remove them from the process. The high surface energy LIQUIFORM™ media effectively disrupts the stabilized water droplets, allowing for efficient capture. Additionally, the fiber geometries are specifically designed to promote accumulation and removal of free water from the process stream. The APEX® element design works in concert with the media technology promoting uniform fluid flow, while minimizing the potential for turbulence and high fluid velocities which might interfere with water removal from the process stream. LIQUISEP® technology protects critical assets from water contamination and the salts, acids and bases which it may contain. Application of the LIQUISEP® technology allows optimized performance of downstream treaters, salt beds, exchangers and reactors while assuring the elimination of haze from finished products.

In some further embodiments of the invention, the at least one filter assembly 375 of the separation system 100 that can include a process technology comprising a ProcessOR® process technology from Pentair, Inc. ProcessOR® provides high performance solid-liquid separation for solid contaminants ranging from sub-micron particulates as small as viruses to particles several hundred microns in size. In this instance, the liquids can range from aqueous to hydrocarbon systems with viscosities up to 60,000 cP, and can be applied to the oil and gas, refinery, chemical, petrochemical and power industries. In another embodiment, a Pentair COMPAX® coreless element can be included, and fluid flows from the outside-to-the-inside. This technology can include an extended surface area media configuration utilizing our proprietary NexCel® media. The media provides robust performance in glycol and aqueous service as well as hydrocarbon applications in some embodiments.

HRT®, POLAREX®, LIQUISEP®, LIQUIFORM™, APEX®, ProcessOR®, COMPAX®, and NexCel® are registered trademarks of Pentair, LTD., or one of its global affiliates.

In order to process an input stream comprising solids, and/or gas, and/or liquid, and mixtures thereof, the separation system 100 can include various ports, valves, drains, and associated connectors and junctions to enable entry of one or more input streams into the primary process vessel 115. For example, referring to at least FIG. 2, some embodiments include ports 400 coupled to or integrated with the primary process vessel 115. Some embodiments include a plurality of ports 400 including a first port 410, and a second port 420, and a third port 430 extending from the top of the primary process vessel 115. Further, some embodiments include a plurality of ports 400 positioned at the bottom of the primary process vessel 115. For example, some embodiments include a fourth port 440, and a fifth port 450, and a sixth port 460. In some embodiments, any one of the plurality of ports 400 can be positioned on other regions of the primary process vessel 115.

In some embodiments, the separation system 100 can include one or more fluid control valves. For example, some embodiments include a plurality of valves 500 configured to control entry or exit of a fluid from the separation system 100. Referring to FIGS. 1, 6-9, and 10, some embodiments include at least a first valve 520, a second valve 540, and a third valve 560 positioned on one side of the primary process vessel 115. Further, some embodiments include at least a fourth valve 570, fifth valve 580, and a sixth valve 590 positioned on an opposite side of the primary process vessel 115. In some embodiments, any one of the plurality of valves 500 can be positioned on other regions of the primary process vessel 115.

Some embodiments include one or more control valves coupled to one or more ports to enable control of a fluid stream into and/or out of the primary process vessel 115. For example, referring to at least FIGS. 1 and 4, some embodiments include at least one end control valve 600 coupled to at least one port. In some embodiments, the at least end control valve 600 can be coupled to at least one T-junction 620. In some embodiments, at least one coupling pipe 640 can be coupled to the at least one T-junction 620 to facilitate transfer of a fluid stream into or out of the primary process vessel 115. Some embodiments include additional control valves, junctions and coupling pipes. For example, in some embodiments, the at least one central control valve 700 can be coupled to at least one T-junction 720. In some embodiments, at least one coupling pipe 740 can be coupled to the at least one T-junction 720 to facilitate transfer of a fluid stream into or out of the primary process vessel 115.

In some embodiments, the separation system 100 can comprise additional fluid inlets or outlets. For example, some embodiments include a plurality of vents 800 extending from the primary process vessel 115. In some embodiments, the separation system 100 can comprise a first vent 820, a second vent 830, and a third vent 840 coupled to or integrated with the primary process vessel 115. In some further embodiments, the separation system 100 can include one or more drains. In some embodiments, the separation system 100 includes a plurality of drains 850 including a first drain 860, a second drain 870, and a third drain 880. In some embodiments, any one of the vents 800 and/or drains 850 can vent or drain a fluid. In some embodiments, fluid can exit the primary process vessel 115 through any one of the vents 800 and/or drains 850. In other embodiments, fluid can enter the primary process vessel 115 through any one of the vents 800 and/or drains 850.

In some embodiments of the invention, the separation system 100 can be configured to process fluids in a variety of manners using a variety of process configurations. The flexible design can allow for multiple flow paths within the need for a different treatment vessel. Moreover, the primary process vessel 115 can be configured to separate a plurality of different fluid streams. For example, in some embodiments, the primary process vessel 115 can be configured to separate four different fluid streams (e.g., particle-laden fluid streams).

Figure 6:
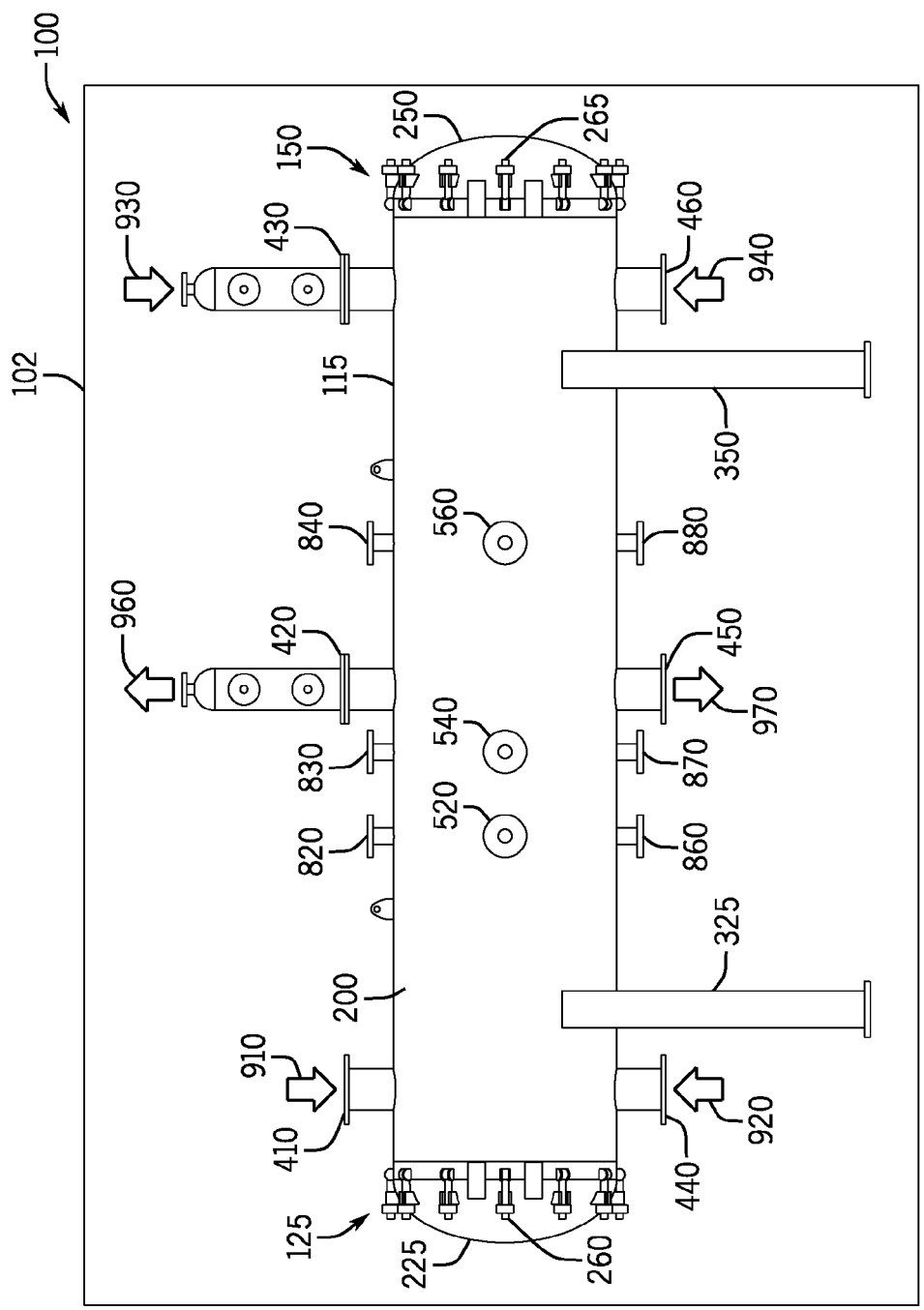
FIG. 6 illustrates a side view of a separation system configured to handle four inlet streams in accordance with some embodiments of the invention.

FIGS. 6-9 illustrate various process configurations of the separation system 100. For example, FIG. 6 illustrates a side view of a separation system 100 configured to handle four inlet streams according to one embodiment of the invention. This configuration (shown as process configuration 102) includes an outside element to inside element flow vessel configured to handle four particle laden inlet streams. The symmetrical design allows for multiple flow paths without the need for a different vessel. Further, the vessel is configured to separate up to four different particle-laden liquid streams. The equipment occupies only ⅔ space required to co-locate two individual vessels of comparable size and configuration. Some embodiments offer a simplified interconnect piping and instrumentation configuration as compared to two separate vessels.

As depicted in FIG. 6, some embodiments include a process configuration 102 that comprises a plurality of inlet streams 900 and a plurality of outlet streams 950. For example, in some embodiments, during one or more fluid process phases, the separation system 100 can comprise a first inlet stream 910 entering the primary process vessel 115 through the first port 410, and a second inlet stream 920 entering the primary process vessel 115 through the fourth port 440. Further, the separation system 100 can comprise a third inlet stream 930 entering the primary process vessel 115 through the third port 430, and a fourth inlet stream 940 entering the primary process vessel 115 through the sixth port 460. Further, the process configuration 102 can comprise a plurality of outlet streams 950. For example, in some embodiments, the process configuration 102 can comprise a first outlet stream 960 exiting the process configuration 102 through the second port 420, and a second outlet stream 970 exiting through the fifth port 450.

Figure 7:
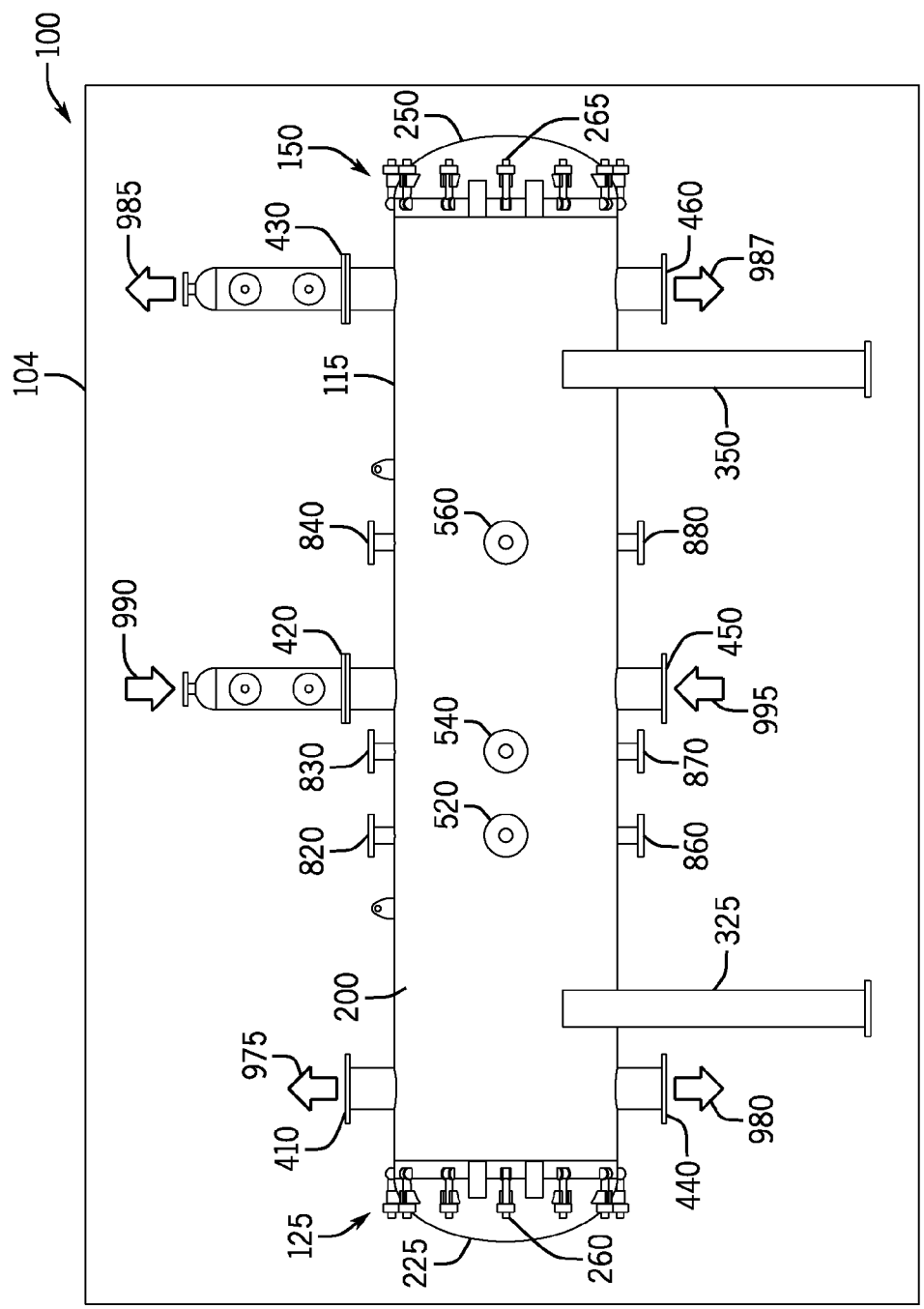
FIG. 7 illustrates a side view of a separation system configured to handle multiple inlet streams and with four outlet streams in accordance with some embodiments of the invention.

Some embodiments of the invention include an inside element to outside element flow. In this example, the primary process vessel 115 can be configured to handle multiple emulsified inlet streams. The symmetrical design allows for multiple flow paths without the need for a different vessel, and can be configured to separate two emulsified liquid streams. For example, FIG. 7 illustrates a side view of a separation system 100 configured to handle multiple inlet streams and with four outlet streams according to one embodiment of the invention. As depicted, the process configuration 104 can comprise a fluid outlet 975 exiting the primary process vessel 115 through the first port 410, a fluid outlet 980 exiting the primary process vessel 115 through the fourth port 440, a fluid outlet 985 exiting the primary process vessel 115 through the third port 430, and a fluid outlet 987 exiting the primary process vessel 115 through the sixth port 460. The process configuration 104 can also comprise a fluid inlet 990 entering the primary process vessel 115 through the second port 420, and a fluid inlet 995 entering the primary process vessel through the fifth port 450.

In some embodiments of the invention, the process configuration 104 can comprise at least one continuous process phase and/or at least one discontinuous phase. For example, some embodiments include the fluid outlet 975 comprising a continuous process phase, and/or the fluid outlet 985 comprising a continuous process phase. Further, in some embodiments, the fourth port 440 can elute a discontinuous phase as the fluid outlet 980, and the sixth port 460 can elute a discontinuous phase through the fluid outlet 987.

Figure 8:
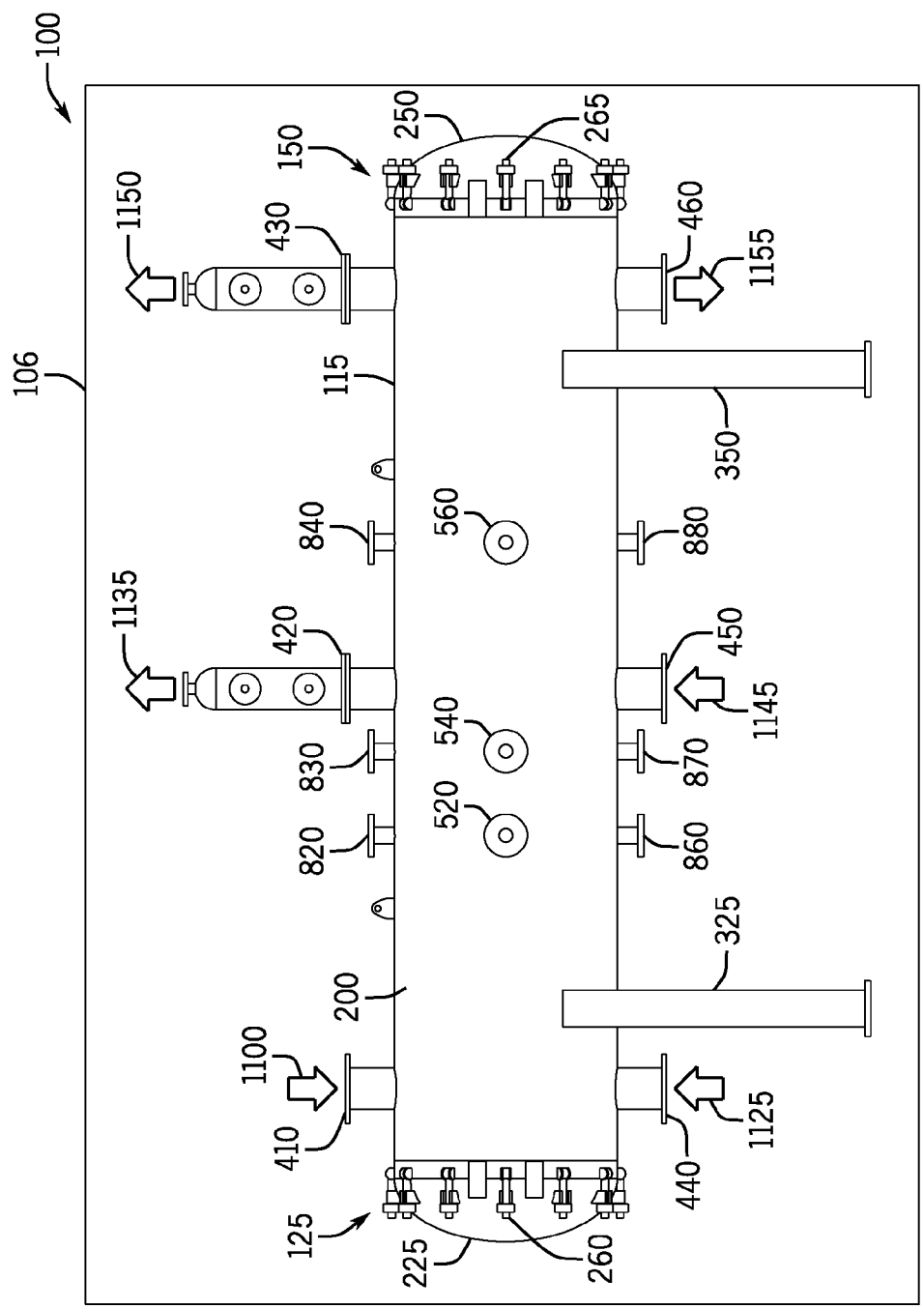
FIG. 8 illustrates a side view of a separation system configured to handle two inlet streams and with three outlet streams in accordance with some embodiments of the invention.

FIG. 8 illustrates a side view of a separation system 100 configured to handle two inlet streams with three outlet streams according to one embodiment of the invention. This example embodiments includes a hydrocarbon recovery technology configuration vessel (primary process vessel 115) configured to handle two particle-laden inlet streams. The symmetrical design allows for multiple flow paths without the need for a different vessel. The hydrocarbon recovery configuration separates particles in the primary phase, and liquid-liquid separation in secondary phase. As depicted, the process configuration 106 can include a fluid inlets 1100, 1125, fluid outlets 1135, 1150, 1155, and a blind 1145. In some embodiments, a fluid stream can enter the primary process vessel 115 through a first port 410 as fluid inlet 1100, and a fluid stream can enter the primary process vessel 115 through a fourth port 440 as fluid inlet 1125. Further, a fluid stream can exit the primary process vessel 115 through the second port 420 as fluid outlet 1135, the third port 430 as fluid outlet 1150, and the sixth port 460 as fluid outlet 1155. In some embodiments, the fluid outlets 1135, 1150 1155 can comprise a discontinuous phase.

Figure 9:
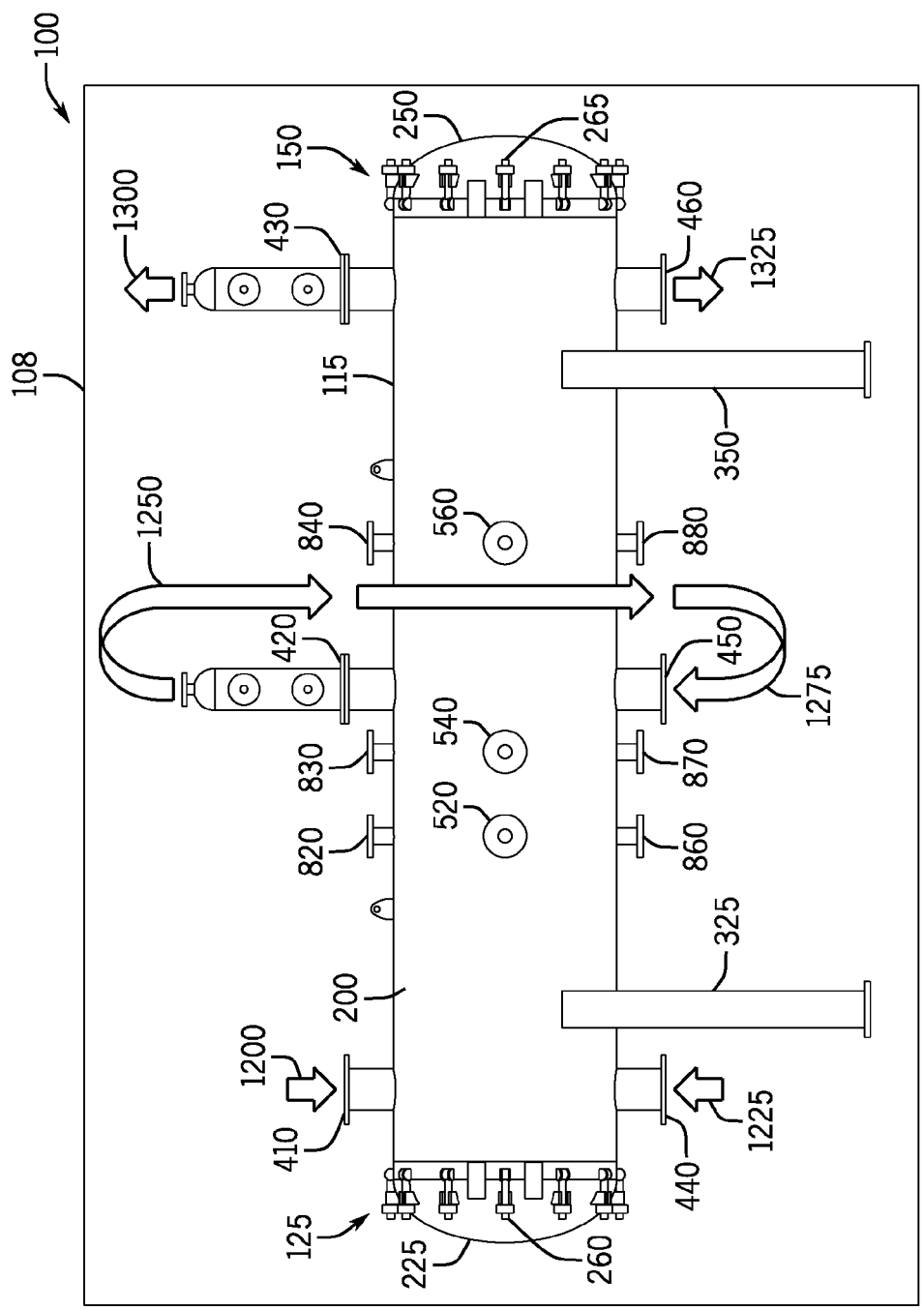
FIG. 9 illustrates a side view of a separation system configured to handle two inlet streams and with two outlet streams and a re-injection process stream in accordance with some embodiments of the invention.

FIG. 9 illustrates a side view of a separation system 100 configured to handle two inlet streams, two outlet streams, and a re-injection process stream according to one embodiment of the invention. In this instance, the use of a polar extraction configuration vessel (primary process vessel 115) configured to handle two particle-laden inlet streams includes a symmetrical design that can allow for multiple flow paths without the need for a different vessel. The polar extraction configuration separates particles in the primary phase, and performs a polar extraction in secondary phase, followed by a final separation phase. For example, the process configuration 108 can comprise a fluid inlet 1200 passing through first port 410, and fluid inlet 1225 passing through the fourth port 440. Further, using the second port 420 (as fluid outlet 1250) and the fifth port 450 as fluid inlet 1275, a wash out and re-injection process can be implemented. For example, in some embodiments, the fluid outlet 1250 can comprise an amine water wash "W1", and the fluid inlet 1275 can comprise a re-injection "W2". In some embodiments, fluid can exit the primary process vessel as fluid outlet 1300 through the third port 430 and as fluid outlet 1325 through the sixth port 460.

Figure 10:
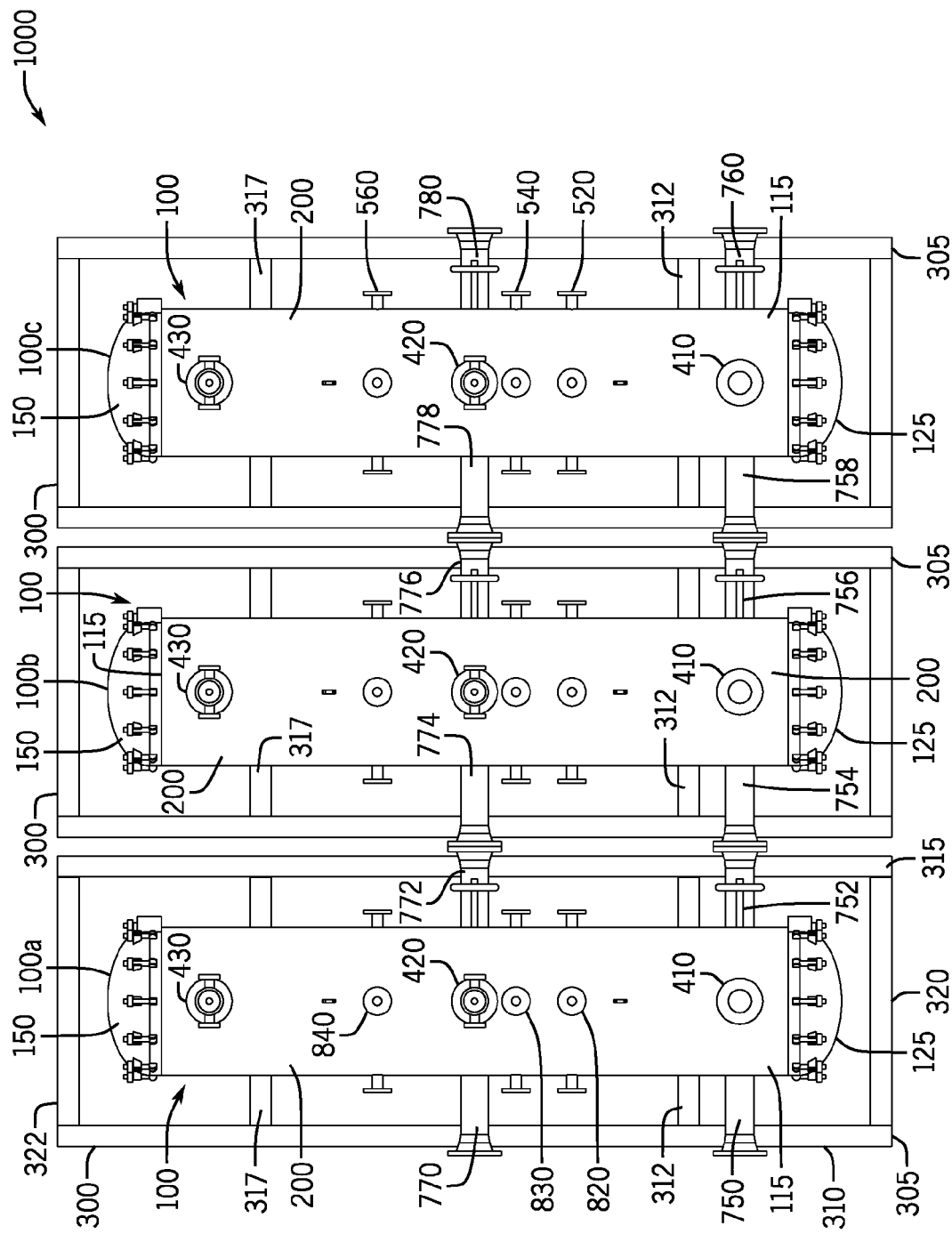
FIG. 10 illustrates a top view of a modular separation system including three coupled separation systems in accordance with some embodiments of the invention.
Figure 11:
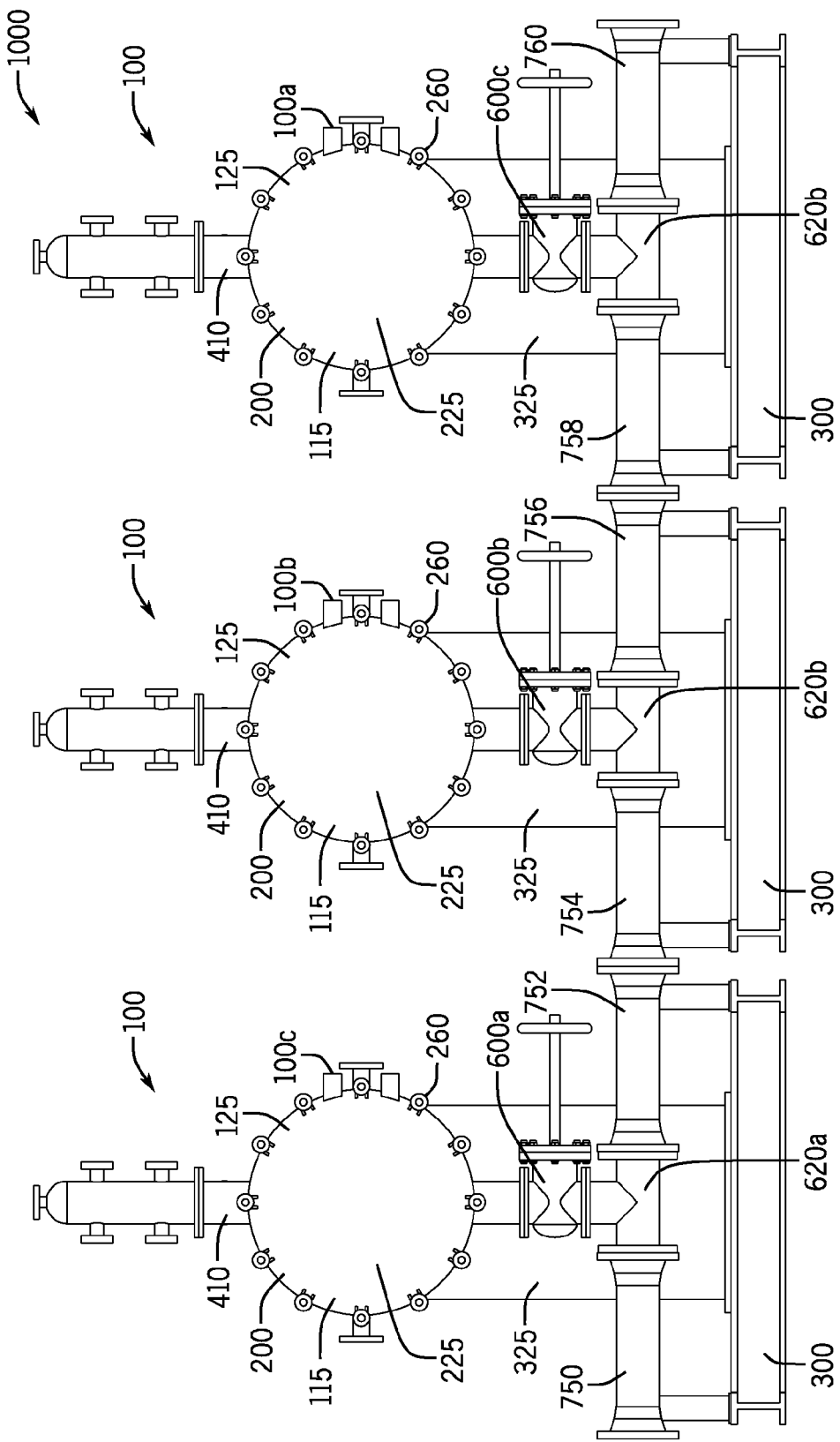
FIG. 11 illustrates an end view of a modular separation system including three coupled separation systems in accordance with some embodiments of the invention.

In some embodiments, two or more of the separation systems 100 shown in FIGS. 1-9 and described herein can be coupled to form a separation system including a plurality of separation systems 100. For example, FIG. 10 illustrates a top view of a modular separation system 1000 including three coupled separation systems 100 according to one embodiment of the invention, and FIG. 11 illustrates an end view of a modular separation system 1000 including three coupled separation systems 100 as shown in FIG. 10. Although shown with three separation and process units, other embodiments can include more or fewer separation and process units coupled in identical or similar ways. Further, as shown, in some embodiments, one or more inlet or outlet tubes can be coupled to form at least one fluid coupling between one separation system 100 and another separation system 100. For example, in some embodiments, the modular separation system 1000 can comprise a first separation system 100a coupled to a second separation system 100b, coupled to a third separation system 100c.

In some embodiments, the modular separation system 1000 can comprise a plurality of fluidly coupled separation systems. For example, in some embodiments, the modular separation system 1000 can comprise a first separation system 100a fluidly coupled to a second separation system 100b, fluidly coupled to a third separation system 100c. In some embodiments, fluid streams entering or exiting the modular separation system 1000 can be controlled by one or more valves. For example, as shown in FIG. 11, in some embodiments, the modular separation system 1000 can comprise a first separation system 100a including an end control valve 600a, and a second separation system 100b including an end control valve 600b, and a third separation system 100c including an end control valve 600c.

In some embodiments, the modular separation system 1000 can include various pipe connectors, junctions, and coupling pipes configured to transfer fluid streams into and out of the modular separation system 1000, and between the separation systems 100a, 100b, 100c. For example, in some embodiments, the first separation system 100a can include a T-junction 620a coupled to the end control valve 600a, a T-junction 620b coupled to the end control valve 600b, and a T-junction 620c coupled to the end control valve 600c.

In some embodiments, the modular separation system 1000 can comprise coupling pipes configured to transfer fluid streams between the various process modules of the modular separation system 1000. For example, in some embodiments, the separation system 100a can comprise a coupling pipe 750 extending from one side of the T-junction 620a, and a coupling pipe 752 extending from an opposite side of the T-junction 620a. Further, in some embodiments, the separation system 100b can comprise a coupling pipe 754 extending from one side of the T-junction 620b, and a coupling pipe 756 extending from an opposite side of the T-junction 620b. Further, in some embodiments, the separation system 100c can comprise a coupling pipe 758 extending from one side of the T-junction 620c, and a coupling pipe 760 extending from an opposite side of the T-junction 620c.

Referring to FIGS. 1 and 10, with the modular separation system 1000 including multiple coupled primary process vessels 115, each with a central control valve 700 and T-junction 720 (not shown in FIG. 10 as the central control valve 700 and T-junction 720 are below the primary process vessel), the modular separation system 1000 can include further fluid coupling junctions for transfer of fluid streams between the separation system 100a, 100b, 100c. In this instance, the combination of valve and pipe-tee coupled to a coupling tube can enable fluid to flow to and from at least one separation system 100 to at least one other separation system 100. Further, this combination of valve and pipe-tee coupled to a coupling tube can enable fluid to flow between at least one separation system generally horizontally within the coupling tube, and to flow from the coupling tube to at least one separation system 100 through at least one valve and into at least one inlet with a flow that is generally perpendicular to the flow in the at least one coupling tube. Further, some embodiments can utilize a reverse flow of fluid comprising a fluid to flow between at least one separation system and at least one other separation system and/or a coupling pipe. For example, in some embodiments, fluid can flow from at least one separation system through at least one valve from at least one outlet with a flow and pass into at least one coupling tube and flow generally perpendicular to the flow in the outlet tube and/or valve.

In some embodiments, the modular separation system 1000 can comprise coupling pipe 770 extending from the separation system 100a on one side and the coupling pipe 772 extending from the separation system 100a on an opposite side. Further, the modular separation system 1000 can comprise coupling pipe 774 extending from the separation system 100b on one side and the coupling pipe 776 extending from the separation system 100b on an opposite side. Further, the modular separation system 1000 can comprise coupling pipe 778 extending from the separation system 100c on one side and the coupling pipe 780 extending from the separation system 100c on an opposite side. In some embodiments, the coupling pipe 772 is fluidly coupled to the coupling pipe 774. Furthermore, in some embodiments, the coupling pipe 776 is fluidly coupled to the coupling pipe 778. In some other embodiments, either of the coupling pipes 770, 780 can be coupled to other separation systems 100 (e.g., when the modular separation system 1000 includes more than three fluidly coupled separation systems 100). In the example embodiments shown in FIGS. 10 and 11, a fluid flow can be established between the separation systems 100a, 100b, 100c. In some embodiments, any of the aforementioned coupling tubes 750, 752, 754, 756, 760, 770, 772, 774, 776, 778, 780 can be supported by the support frame 300.

It will be appreciated by those skilled in the art that while the invention has been described above in connection with particular embodiments and examples, the invention is not necessarily so limited, and that numerous other embodiments, examples, uses, modifications and departure from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A filtration system comprising at least one separation system, the separation system comprising:
   a primary process vessel comprising a main body including first and second ends, the main body enclosing an internal volume;
   at least one removable end cap coupled to at least one of the ends of the main body;
   a first filter support and a second filter support positioned in the internal volume, the first filter support and the second filter support enclosing an interior volume positioned between the first filter support and the second filter support in the internal volume of the main body;
   a first filter assembly coupled to the first filter support and a second filter assembly coupled to the second filter support, the first filter assembly and the second filter assembly arranged to place the internal volume in fluid communication with the interior volume;
   at least one fluid inlet port arranged to enable one or more liquid emulsion stream having a continuous liquid phase and a discontinuous liquid phase to enter the internal volume of primary process vessel and contact the first filter assembly and the second filter assembly to generate a treated liquid stream where at least a portion of the continuous liquid phase is separated from the discontinuous liquid phase;
   a first product fluid outlet port, wherein the first product fluid-outlet port is in a top portion of the primary process vessel and arranged to enable a first portion of the continuous liquid phase in the treated liquid stream to exit the primary process vessel;
   a second product fluid outlet port, wherein the second product fluid outlet port is in a bottom portion of the primary process vessel and arranged to enable a first portion of the discontinuous liquid phase in treated liquid stream to exit the primary process vessel, and wherein the first product fluid outlet port and the second product fluid outlet port are arranged opposite each other on the first end of the primary process vessel;
   a third product fluid outlet port, wherein the third product fluid outlet port is in the top portion of the primary process vessel and arranged to enable a second portion of the continuous liquid phase to exit the primary process vessel; and
   a fourth product fluid outlet port, wherein the fourth product fluid outlet port is in a bottom portion of the primary process vessel and arranged to enable a second portion of the discontinuous liquid phase to exit the primary process vessel, and wherein the third product fluid outlet port and the fourth product fluid outlet port are arranged opposite each other on the second end of the primary process vessel.

2. The filtration system of claim 1, further comprising a plurality of fluid apertures including at least one vent and at least one drain.

3. The filtration system of claim 2, further comprising at least one control valve coupled to at least one aperture.

4. The filtration system of claim 3, wherein the at least one control valve is coupled to the at least one aperture using a T-junction.

5. The filtration system of claim 3, wherein the separation system is fluidly coupled to at least one other separation system using the at least one aperture.

6. The filtration system of claim 1, further comprising a support frame, the at least one separation system mounted on the support frame.

7. The filtration system, of claim 6, wherein the support frame comprises at least one support coupled to and at least partially supporting the primary process vessel.

8. The filtration system of claim 1, wherein the first filter assembly and the second filter assembly each include at least one coalescing filter.

9. The filtration system of claim 1, wherein the first filter assembly and the second filter assembly each include at least one filter arranged to filter hydrocarbons.

10. The filtration system of claim 1, wherein the first product fluid outlet port and the second product fluid outlet port are arranged opposite each other within the primary process vessel.

11. The filtration system of claim 1, wherein the third product fluid outlet port and the fourth product fluid outlet port are arranged opposite each other within the primary process vessel.

12. A filtration system comprising at least one separation system, the separation system comprising:
   a primary process vessel comprising a main body including first and second ends, the main body enclosing an internal volume;
   a first filter support and a second filter support positioned in the internal volume, the first filter support and the second filter support enclosing an interior volume positioned between the first filter support and the second filter support;
   a first filter assembly coupled to the first filter support and a second filter assembly coupled to the second filter support, the first filter assembly and the second filter assembly arranged to place the internal volume in fluid communication with the interior volume;
   at least a first fluid inlet port and a second fluid inlet port arranged to enable one or more untreated liquid emulsion stream having a continuous liquid phase and a discontinuous liquid phase to enter the primary process vessel and contact the first filter assembly and the second filter assembly to generate a treated fluid stream where at least a portion of the continuous liquid phase is separated from the discontinuous liquid phase,
   wherein the first fluid inlet port is arranged to enable the one or more untreated liquid emulsion stream to enter the primary process vessel and contact the first filter assembly, and the second fluid inlet port is arranged to enable the one or more untreated fluid stream to enter the primary process vessel and contact the second filter assembly,
   wherein the first fluid inlet port is arranged on the first end of the primary process vessel;
   a first product fluid outlet port, wherein the first product fluid outlet port is arranged to enable the continuous liquid phase to exit the internal volume through a top portion of the primary process; and
   a second product fluid outlet port, wherein the second product fluid outlet port is arranged to enable the discontinuous liquid phase to exit the internal volume through a bottom portion of the primary process vessel, wherein the first product fluid outlet port and the second product fluid outlet port are arranged opposite each other on the second end of the primary process vessel.

13. The filtration system of claim 12 further including a coupling pipe connected to the second outlet port through a T-junction.

14. The filtration system of claim 12 further comprising a frame, wherein the primary process vessel is coupled to the frame through a first support and a second support, and wherein the coupling pipe is coupled to at least a portion of the frame.

15. The filtration system of claim 12, wherein the coupling pipe is perpendicular to the primary process vessel.

16. A filtration system comprising at least one separation system, the separation system comprising:
- a primary process vessel comprising a main body including first and second ends, the main body enclosing an internal volume;
- a first filter support and a second filter support positioned in the internal volume, the first filter support and the second filter support enclosing an interior volume positioned between the first filter support and the second filter support;
- a first filter assembly coupled to the first filter support and a second filter assembly coupled to the second filter support, the first filter assembly and the second filter assembly arranged to place the internal volume in fluid communication with the interior volume;
- at least one fluid inlet port arranged to enable one or more untreated liquid emulsion stream having a continuous liquid phase and a discontinuous liquid phase to enter the primary process vessel and contact the first filter assembly to generate a first treated fluid stream in the internal volume of the main body, and wherein the second filter assembly is arranged downstream of the first filter assembly such that the first treated fluid stream contacts the second filter assembly to generate a second treated fluid stream;
- a first product fluid outlet port, wherein the first product fluid outlet port is arranged to enable a first portion of the discontinuous liquid phase to exit the internal volume through a top portion of the primary process vessel;
- a second product fluid outlet port, wherein the second product fluid outlet port is arranged to enable a second portion of the discontinuous liquid phase to exit the primary process vessel through the top portion of the primary process vessel; and
- a third product fluid outlet port, wherein the third product fluid outlet port is arranged to enable a third portion of the discontinuous liquid phase to exit a bottom portion of the primary process vessel,
- wherein the first product fluid outlet port, the second product fluid outlet port, and the third product fluid outlet port each have an opening diameter of equal size.

* * * * *